(12) United States Patent
Seikai

(10) Patent No.: US 7,120,525 B2
(45) Date of Patent: Oct. 10, 2006

(54) ACTIVATION CONTROL DEVICE FOR AIRBAG DEVICE

(75) Inventor: Hiroshi Seikai, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 10/537,753

(22) PCT Filed: Dec. 10, 2003

(86) PCT No.: PCT/JP03/15805

§ 371 (c)(1),
(2), (4) Date: Jun. 7, 2005

(87) PCT Pub. No.: WO2004/052697

PCT Pub. Date: Jun. 24, 2004

(65) Prior Publication Data

US 2006/0113778 A1    Jun. 1, 2006

(30) Foreign Application Priority Data

Dec. 11, 2002  (JP)  .......................... P2002-359784

(51) Int. Cl.
B60R 21/01  (2006.01)
(52) U.S. Cl. .................. 701/45; 280/735; 180/282
(58) Field of Classification Search .................. 701/29, 701/45, 46, 47; 280/735; 180/271, 282
See application file for complete search history.

(56) References Cited

U.S. PATENT DOCUMENTS 6,175,299 B1 * 1/2001 Manlove et al. ............ 340/436
6,219,606 B1 * 4/2001 Wessels et al. ............... 701/45
6,282,474 B1 * 8/2001 Chou et al. ................... 701/45
6,748,307 B1 * 6/2004 Sala et al. ..................... 701/46

FOREIGN PATENT DOCUMENTS

| JP | 11-059322   | 3/1999 |
| JP | 2000-209677 | 7/2000 |
| JP | 2001-018744 | 1/2001 |
| JP | 2001-039264 | 2/2001 |
| JP | 2001-050972 | 2/2001 |

* cited by examiner

Primary Examiner—Gary Chin
(74) Attorney, Agent, or Firm—Squire, Sanders & Dempsey L.L.P.

(57) ABSTRACT

An activation control device for an airbag device decreases the management costs by generalization of satellite sensors. There is provided at least one impact detection section disposed at a predetermined position of a vehicle, which detects a degree of shock applied to the vehicle; and a main control section connected to the impact detection section by communication, which determines a collision state based on an output signal of the impact detection section received from the impact detection section, and controls activation of the airbag device installed in the vehicle. The impact detection section receives and stores threshold data relating to a detected degree of shock, from the main control section, and controls transmission of an output signal to the main control section based on the stored threshold data. The main control section stores predetermined threshold data corresponding to each impact detection section disposed in the vehicle; and transmits the stored threshold data to the corresponding impact detection section.

6 Claims, 6 Drawing Sheets

| SENSOR ID | THRESHOLD |
|---|---|
| ID1 | A |
| ID2 | B |
| ID3 | A |
| ID4 | C |

| THRESHOLD | TRANSMISSION DATA |
|-----------|-------------------|
| A | 1 |

ACTIVATION CONTROL DEVICE FOR AIRBAG DEVICE

TECHNICAL FIELD

The present invention relates to an activation control device for an airbag device used as a supplemental restraint system (SRS) in order to protect occupants in the event of vehicle collision.

BACKGROUND ART

Conventionally, an activation control device for an airbag device includes; a floor sensor (deceleration sensor) disposed at the midsection of the vehicle body, and a satellite sensor (deceleration sensor) disposed at the front of the vehicle body, and a main control section determines a collision state of the vehicle based on an output signal of each of the sensors, to thereby control the activation of the airbag device. The floor sensor is generally disposed near the main control section, and the output signal thereof is transmitted directly to the main control section. Alternatively, the floor sensor is built into the main control section. The main control section, is, for example, disposed near the center console.

On the other hand, the satellite sensor is, for example, disposed near the front bumper, and the output signal thereof is transmitted to the main control section through a communication cable. For example, the satellite sensor digitizes a detection signal, and constantly transmits the digital signal thereof to the main control section. Furthermore, there is also an arrangement where the satellite sensor has a previously set threshold, and when the detected deceleration exceeds the threshold, an output signal indicating that the threshold has been exceeded is transmitted to the main control section (refer for example to Japanese Unexamined Patent Application, First Publication No. H11-59322).

For the communication method between the satellite sensor and the main control section, a serial communication method is used, from reasons such as decreasing the number of cables installed in the vehicle.

However, in the aforementioned conventional device where the satellite sensor continuously transmits output signals to the main control section, there is a problem in that if a plurality of satellite sensors is installed, the communication traffic increases, making multiplex transmission through serial communication difficult. Particularly in recent years, vehicle body construction where the crushable zone is reduced and the vehicle body hardness is increased, in order to expand the compartment (cabin) section, is increasing. In such a vehicle body construction, there is a need to determine the collision states, such as offset collisions and low speed collisions, with good accuracy. For this reason, a plurality of satellite sensors are disposed on the vehicle, such as at the front right, the front left, and on the left and right sides. However, with conventional devices, it is difficult to correspond to these.

On the other hand, in a device where the satellite sensors are made to hold a previously set threshold, and when the detected deceleration exceeds that threshold, an output signal indicating that the threshold has been exceeded is transmitted to the main control section, the communication traffic is decreased, thus solving the problem of traffic load. However, to determine the collision state with good accuracy, it is necessary for the threshold to be an optimal value depending on the position in which the satellite sensor is disposed. Therefore, it is necessary to construct satellite sensors holding every type of threshold. Furthermore, the threshold is different for each type of vehicle and its destination (delivery). Therefore, the number of types of satellite sensor becomes enormous.

In the case where in this manner very many types of satellite sensor are manufactured, there is a problem in that manufacturing management costs become large, becoming a liability.

DISCLOSURE OF INVENTION

The present invention takes the aforementioned circumstances into consideration, with an object of providing an activation control device for an airbag device which is able to decrease the management costs by generalization of satellite sensors which control output based on set thresholds.

Accordingly, the present invention provides, an activation control device for an airbag device including:

at least one impact detection section disposed at a predetermined position of a vehicle, which detects a degree of shock applied to the vehicle; and a main control section connected to the impact detection section by communication, which determines a collision state based on an output signal of the impact detection section received from the impact detection section, and controls activation of the airbag device installed in the vehicle;

and wherein the impact detection section includes:

a threshold storage section for storing threshold data relating to a detected degree of shock;

a storage control section which receives the threshold data from the main control section and stores the threshold data in the threshold storage section; and a transmission control section which controls transmission of an output signal to the main control section based on the threshold data stored in the threshold storage section; and the main control section includes:

a threshold storage memory section which stores predetermined threshold data corresponding to each impact detection section disposed in the vehicle; and a setting control section which transmits the threshold data stored in the threshold storage memory section to the corresponding impact detection section.

According to the present construction, it is possible to set a predetermined threshold for controlling transmission of the output signal, with respect to each impact detection section (satellite sensor, etc.), from the main control section. As a result, it is possible to generalize the satellite sensors, and it is possible to decrease management costs associated with production and the like. Furthermore, it is possible to correspond to changes in the threshold specification with flexibility.

The impact detection section may include a self-diagnosis section which diagnoses a storage state of the threshold storage section furnished within itself, and may transmit the diagnosis result to the main control section, and the main control section may determine the normality of the impact detection section, based on the diagnosis result received from the impact detection section.

In this case, the normality of the impact detection section is determined based on the diagnosis result of the storage section which stores the thresholds, and the determination result is output. Therefore, it is possible to detect any problems when setting the generalized satellite sensors to the individual specifications. The main control section may, in a situation where it did not receive from the impact detection section a diagnosis result showing normality of the impact detection section, output a determination result indicating that the impact detection section is not normal.

Furthermore, the impact detection section may include: a transmission data storage section for storing the transmission data which has a one-to-one correspondence with the threshold data;

the storage control section may receive the transmission data from the main control section and may store it in the transmission data storage section;

the transmission control section, in a situation where a degree of shock detected by the impact detection section within itself exceeds a threshold corresponding to any of the threshold data stored in the threshold storage section, may transmit transmission data corresponding to the threshold data, stored in the transmission data storage section, to the main control section;

the main control section may include:

a transmission data storage memory section which stores predetermined transmission data which has a one-to-one correspondence with the threshold data stored in the threshold storage memory section; and a detection section which detects a degree of shock detected by the impact detection section, by referring to stored information in the transmission data storage memory section, based on transmission data received from the impact detection section; and the setting control section may transmit the transmission data which is stored in the transmission data storage memory section to the collision detector section in which the corresponding threshold data is set.

In this case, by means of the transmission data corresponding to the threshold, the detection result of the degree of shock is notified from the impact detection section to the main control section. Therefore, the communications traffic can be decreased and the traffic load can be reduced. Furthermore, also for the transmission data, this is set from the main control section to the impact detection section. Therefore, it is possible to correspond to changes in the threshold specification with flexibility.

In such a construction, the impact detection section may include a self-diagnosis section which diagnoses a storage state of the threshold storage section and the transmission data storage section furnished within itself, and transmits the diagnosis result to the main control section; and the main control section may determine the normality of the impact detection section based on the diagnosis result received from the impact detection section.

In such as situation, the normality of the impact detection section is determined based on the diagnosis result of the storage section which stores the threshold and transmission data, and this determination result is output. Therefore, it is possible to detect any problems when setting the generalized satellite sensors to the individual specifications. The main control section may, in a situation where it did not receive from the impact detection section a diagnosis result showing normality of the impact detection section, output a determination result indicating that the impact detection section is not normal.

BEST MODE FOR CARRYING OUT THE INVENTION

Hereunder is a description of an embodiment of the present invention, with reference to the drawings.

Figure 1:
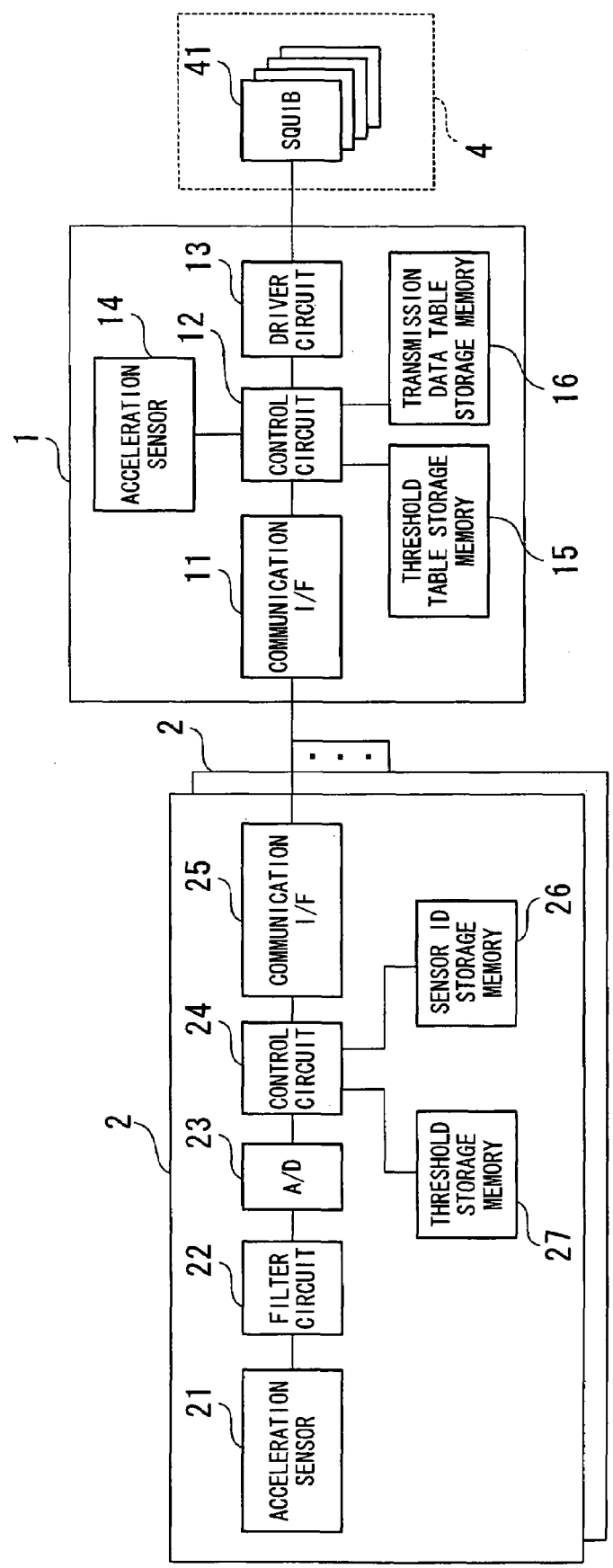
FIG. 1 is a block diagram showing a configuration of an activation control device for an airbag device according to an embodiment of the present invention.
Figures 2, 3:
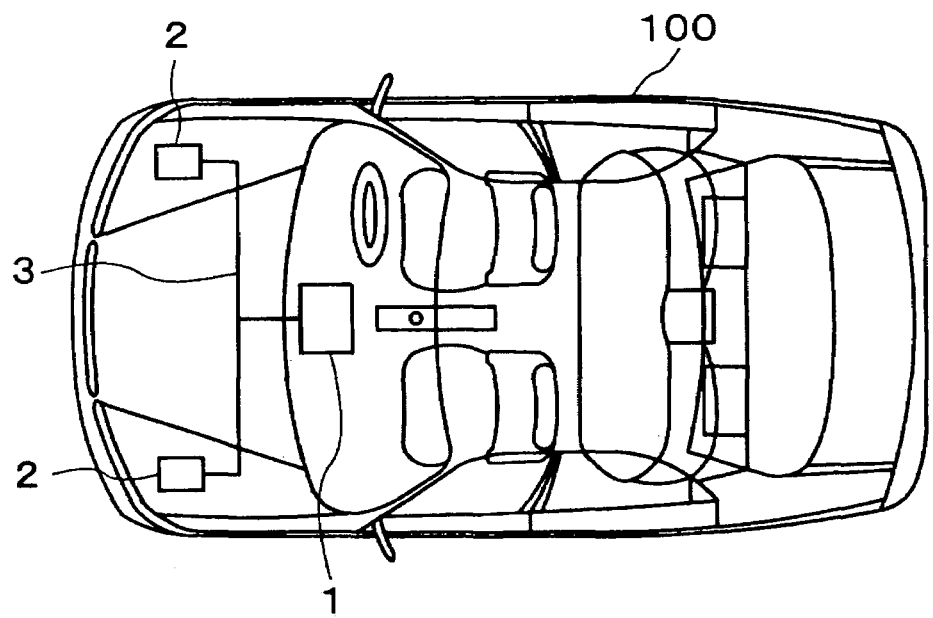
FIG. 2 is a diagram for explaining a vehicle installation state example of an activation control device for an airbag device according to the embodiment.
FIG. 3 is a drawing showing a configuration example of a threshold table 15a stored in a threshold table storage memory 15.

FIG. 1 is a block diagram showing a configuration of an activation control device for an airbag device according to the embodiment of the present invention. FIG. 2 is a diagram for explaining an actual vehicle installation state example of an activation control device for an airbag device according to the embodiment.

In FIG. 1, the activation control device for an airbag device includes a main control section 1 and a plurality of satellite sensors 2. The main control section 1 and each satellite sensor 2 are connected by a communication cable 3.

As shown in FIG. 2, the main control section 1 is disposed near a center console of a vehicle 100. Furthermore, the two satellite sensors 2 are disposed respectively to the front right side and the front left side of the vehicle 100. Moreover, each satellite sensor 2 is connected to the main control section 1 by a communication cable 3 as mentioned above.

For convenience, FIG. 2 shows only two satellite sensors 2. However, three or more satellite sensors 2 may be installed, and those satellite sensors 2 may also be connected by the communication cable 3.

The main control section 1 is connected to an airbag device 4. A squib 41 for driving the airbag device 4 is activated by an activation signal which is output from the main control section 1, thereby inflating the airbag (not shown in the drawing).

The main control section 1 may also be constituted by an electronic control unit (ECU).

In the main control section 1, a communication interface (communication I/F) 11 sends and receives data between the satellite sensors 2 via the communication cable 3, by serial communication.

The control circuit 12 includes a CPU (central processing unit) and a memory, and controls each part of the main control section 1 and all the satellite sensors 2. Furthermore, the control circuit 12 performs collision determination processing according to a predetermined collision determination algorithm, and determines collision states such as offset collisions and low-speed collisions. The control circuit 12 outputs an activation signal based on the collision determination result, via a driver circuit 13 to the airbag device 4. An acceleration sensor 14 is for detecting deceleration in a central part of the vehicle body. An output signal from the acceleration sensor 14 is input to the control circuit 12.

A threshold table storage memory 15 previously stores for each sensor identifier (a sensor ID for identifying each of the satellite sensors) for at least every satellite sensor 2 installed on the vehicle 100, a threshold table holding corresponding thresholds. The threshold table storage memory 15 includes nonvolatile memory. FIG. 3 is a drawing showing a configuration example of a threshold table 15a stored in the threshold table storage memory 15.

As shown in FIG. 3, in the threshold table 15a, corresponding thresholds are set for each sensor ID. The sensor IDs are assigned for each vehicle type and for each installation position of the satellite sensors 2. Furthermore, there are also cases where they are assigned for each shipping destination. The thresholds are for deceleration notification determination, for determining whether or not the decelerations detected by the satellite sensors 2 are decelerations which are targets for notification from the satellite sensors 2 to the main control section 1.

The control circuit 12 performs processing for setting the threshold data corresponding to the sensor ID of each satellite sensor 2, to the relevant satellite sensor 2, based on the threshold table 15a.

Figures 4, 5:
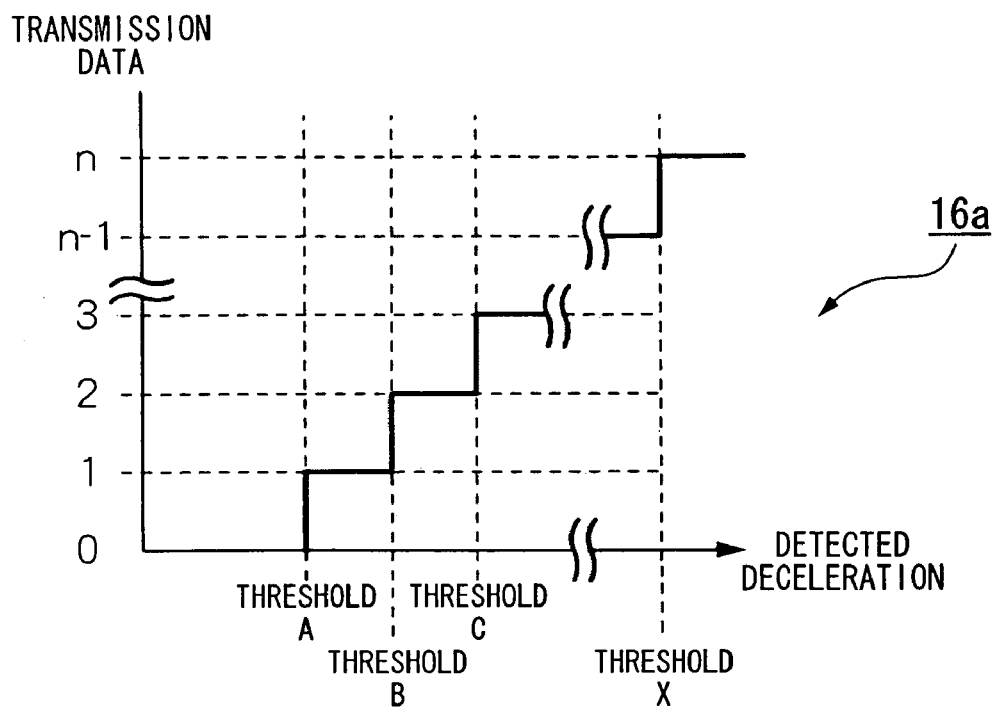
FIG. 4 is a diagram showing a setting example of a transmission data table 16a stored in a transmission data table storage memory 16.
FIG. 5 is a diagram showing a memory structure example of a threshold storage memory 27.

The transmission data table storage memory 16 previously stores a transmission data table 16a which holds the transmission data of the satellite sensors 2 corresponding to each threshold for deceleration notification determination. The transmission data table storage memory 16 includes nonvolatile memory. FIG. 4 is a diagram showing a setting example of a transmission data table 16a stored in the transmission data table storage memory 16.

As shown in FIG. 4, for each and every threshold, in the case where the deceleration detected by the satellite sensor 2 exceeds the relevant threshold, the data which the relevant satellite sensor 2 transmits to the main control section 1, is set. This transmission data is data showing that the deceleration detected by the satellite sensor 2 has exceeded the relevant threshold.

The control circuit 12 performs processing for setting the transmission data corresponding to the threshold that has been set for each satellite sensor 2, to the relevant satellite sensor 2, based on the transmission data table 16a.

For example, as shown in FIG. 4, in a satellite sensor 2 in which the threshold A is set, transmission data "1" is set. As a result, when the deceleration detected by the relevant satellite sensor 2 exceeds the threshold A, the transmission data "1" is transmitted to the main control section 1. The control circuit 12 of the main control section 1 receives the corresponding transmission data "1", and can thus detect that the deceleration detected by the relevant satellite sensor 2 has exceeded the threshold A, based on the transmission data table 16a.

In a satellite sensor 2, the acceleration sensor 21 is for detecting the deceleration of the installation location of its own satellite sensor 2. After the noise and the like have been removed from the output signal of the acceleration sensor 21 by a filter circuit 22, the output signal is digitized by an analog to digital conversion section (A/D) 23 and input to the control circuit 24.

The control circuit 24 includes a CPU and memory. The control circuit 24 detects the deceleration based on the sensor output signal input from the A/D 23. Then, if the detected deceleration exceeds the threshold used for deceleration notification determination stored in a threshold storage memory 27, transmission data (this transmission data also is stored in the threshold storage memory 27) indicating that the threshold has been exceeded, is transmitted to the main control section 1 by the communication interface (communication I/F) 25. Furthermore, the control circuit 24 controls the writing of the threshold storage memory 27 according to instructions from the main control section 1.

The communication I/F 25 transmits and receives data between itself and the communication I/F 11 of the main control section 1 via the communication cable 3, using a serial communication method.

A sensor ID storage memory 26 previously stores the sensor ID of its own satellite sensor 2. The sensor ID storage memory 26 includes nonvolatile memory.

The threshold storage memory 27 is constructed with rewritable nonvolatile memory, and may be written and read from the control circuit 24. FIG. 5 is a diagram showing a memory structure example of the threshold storage memory 27.

As shown in FIG. 5, the threshold storage memory 27 stores the threshold used for deceleration notification determination of its own satellite sensor 2, and transmission data for transmission to the main control section 1 when the detected deceleration of its own satellite sensor 2 exceeds the threshold. The control circuit 24 receives the threshold data and the transmission data for its own satellite sensor 2, from the main control section 1, and writes it to the threshold storage memory 27.

Next, the operation of the aforementioned activation control device for an airbag device according to FIG. 1 is explained.

Figure 6:
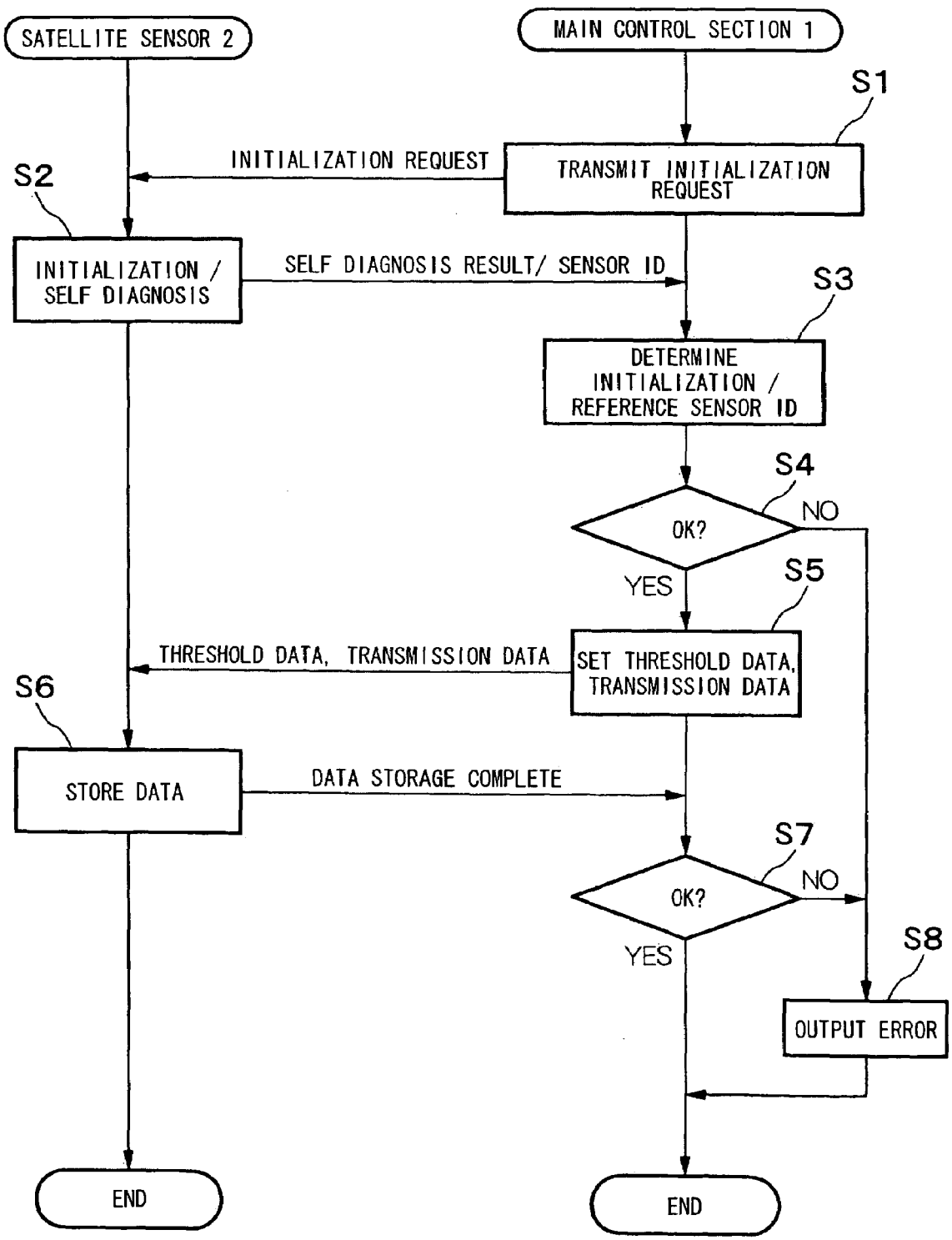
FIG. 6 is a sequence chart showing the flow of an initialization process performed in the activation control device for an airbag device shown in FIG. 1.

Firstly, the operation relating to initialization of the satellite sensor 2 is explained with reference to FIG. 6. FIG. 6 is a sequence chart showing the flow of an initialization process performed in the activation control device for an airbag device shown in FIG. 1.

For convenience of description, the following explanation focuses on only one satellite sensor 2; however, the same explanation holds for all satellite sensors 2. Furthermore, the transmitting and receiving of data between the main control section 1 and the satellite sensor 2 is performed by the communication I/Fs 11 and 25, via the communication cable 3.

Firstly, after the power is turned on, the control circuit 12 of the main control section 1 transmits an initialization request to the satellite sensor 2 (in step S1). When the control circuit 24 of the satellite sensor 2 receives the initialization request, all parts of the circuit and the threshold storage memory 27 are initialized, followed by a self-diagnosis of whether the initialization was completed normally or not. When the self-diagnosis is completed, the result of the self-diagnosis, and the sensor ID stored in the sensor ID storage memory 26, are transmitted to the main control section 1 (in step S2).

When the control circuit 12 of the main control section 1 receives the self-diagnosis result and the sensor ID, it is determined whether the initialization of the satellite sensor 2 was completed normally or not, based on the self-diagnosis result. Furthermore, the received sensor ID is checked against the sensor ID in the threshold table 15a of the threshold table storage memory 15, and it is determined whether the received sensor ID is set in the threshold table or not (in step S3).

If the determination of step S3 is that both determination results are OK, that is, the initialization of the satellite sensor 2 is completed normally, and the received sensor ID is set in the threshold table 15a, the flow proceeds to step S5. On the other hand, if either of the determination results were NG, the flow proceeds to step S8 (in step S4).

In step S5, the control circuit 12 reads the threshold data pertinent to the received sensor ID from the threshold table 15a. Furthermore, it reads the transmission data corresponding to the threshold data from the transmission data table 16a. Then, it transmits the read out threshold data and the transmission data to the satellite sensor 2, and instructs the setting of each data in the satellite sensor 2.

Next, when the control circuit 24 of the satellite sensor 2 receives the threshold data and the transmission data, it writes it into the threshold storage memory 27 (in step S6). Once the writing is completed, the control circuit 24 transmits a signal indicating that data storage has been completed, to the main control section 1. The control circuit 12 of the main control section 1 determines whether the data storage completion signal has been received or not, and whether the setting of the threshold data and the transmission data have been completed normally or not (in step S7). That is, when the data storage completion signal is received, the series of processing is terminated (when the determination result in step S7 is YES).

On the other hand, if the data storage completion is not received within a fixed time interval, the control circuit 12 determines that the setting of the threshold data and the transmission data has failed, and the flow proceeds to step S8 (when the determination result in step S7 is NO). In step S8, an error signal to report that the initialization of the satellite sensor 2 has failed is output to the outside.

Figure 7:
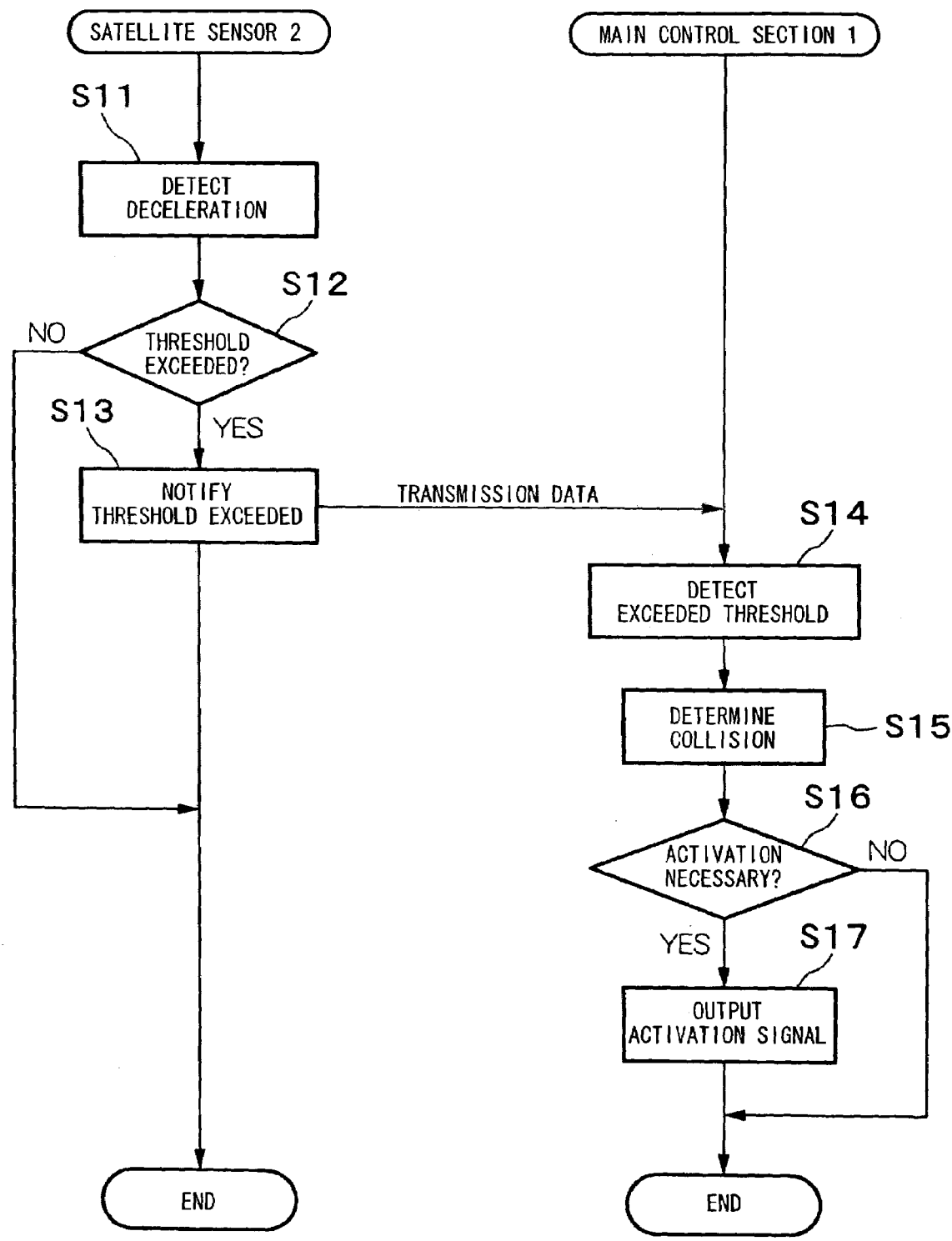
FIG. 7 is a sequence chart showing the flow of the routine processing performed in the activation control device for an airbag device shown in FIG. 1.

Next, the routine operation of the activation control device for an airbag device is explained with reference to FIG. 7. FIG. 7 is a sequence chart showing the flow of the routine processing performed in the activation control device for an airbag device shown in FIG. 1. FIG. 7 shows the processing of one sequence of the routine processing.

First, the control circuit 24 of the satellite sensor 2 detects deceleration based on a sensor output signal input from the A/D 23 (in step S11). Next, it determines whether the detected deceleration has exceeded the threshold which is stored in the threshold storage memory 27 or not (in step S12). In the case where it is exceeded (when the determination in step S12 is YES), the transmission data stored in the threshold storage memory 27 is transmitted to the main control section 1 (in step S13). Here, the control circuit 24 transmits the transmission data repeatedly at predetermined time intervals. Furthermore, if it is determined that the detected deceleration does not exceed the threshold stored in the threshold storage memory 27 (when the determination in step S13 is NO), the series of processing is terminated.

Next, when the control circuit 12 of the main control section 1 receives the transmission data, it detects which of the thresholds is exceeded by the deceleration detected by the relevant satellite sensor 2, based on the transmission data table 16a (in step S14).

Next, from the deceleration detection result of the satellite sensor 2 (that is, the exceeded threshold), and the deceleration detected based on the output signal from the acceleration sensor 14 installed to the main control section 1, the control circuit 12 performs a collision determination processing according to a predetermined collision determination algorithm (in step S15).

Next, from the collision determination result, the control circuit 12 determines whether activation of the airbag device is necessary or not (in step S16), and in the case where it is necessary (when the determination in step S16 is YES), it outputs an activation signal to the airbag device 4, to inflate and deploy the airbag by the squib 41 (in step S17). As a result, the series of processing is terminated.

On the other hand, in a situation where the activation of the airbag device is not necessary (when the determination in step S16 is NO), the processing is terminated at once.

Figure 8:
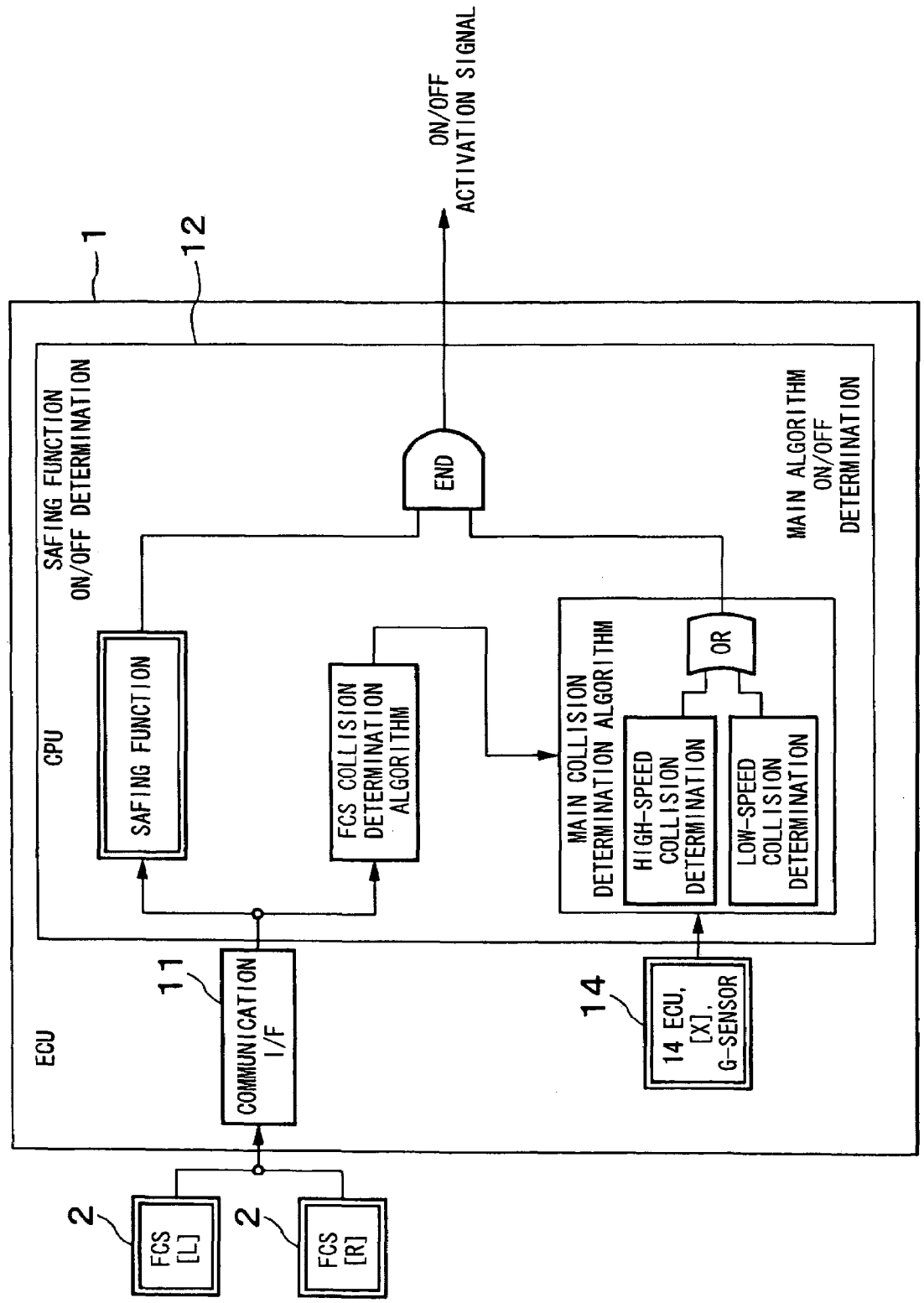
FIG. 8 is a schematic diagram showing an example of a collision determination algorithm.

FIG. 8 is a schematic diagram showing an example of a collision determination algorithm. The collision determination algorithm shown in FIG. 8 is the same as one conventionally used.

In FIG. 8, the control circuit 12 (CPU) of the main control section 1 (ECU) receives the respective transmission data from a satellite sensor 2 disposed on the front right side of the vehicle (FCS; Front Crash Sensor, [R]), and a satellite sensor 2 disposed on the front left side of the vehicle (FCS; Front Crash Sensor, [L]), by the communication I/F 11, and detects exceeded thresholds corresponding to each transmitted data.

Then, from the detection result (the exceeded threshold) of the deceleration of the satellite sensors 2, and from the deceleration detected based on an output signal from the acceleration sensor 14 (ECU, [X], G-sensor) installed in the main control section 1, the control circuit 12 (CPU) performs collision determination according to the flow of the collision determination algorithm shown in FIG. 8.

In the collision determination algorithm in FIG. 8, deceleration data of the two FCSs is used to execute; a safing function which considers prevention of accidental inflation of the air bag and outputs an ON/OFF signal, and an FCS collision determination algorithm. Furthermore, the main collision determination algorithm is executed using the execution results of the collision determination algorithm, and the deceleration data from the G-sensor of the ECU.

The main collision determination algorithm performs determination of high-speed collisions and determination of low-speed collisions, and outputs the logical sum of the determination result. Then, the logical product of the output of the safing function and the output of the main collision determination algorithm is output as the activation signal of the airbag device (that is, if both are ON outputs, the airbag is activated).

As mentioned above, according to the present embodiment, it is possible to set a predetermined threshold for controlling transmission of the output signal with respect to each satellite sensor, from the main control section. As a result, it is possible to generalize the satellite sensors, and it is possible to decrease management costs associated with production and the like. Furthermore, it is possible to correspond to changes in the threshold specification with flexibility.

Moreover, depending on the transmission data corresponding to the threshold, the detection results of the deceleration are notified from the satellite sensor to the main control section. Therefore, the communication traffic can be decreased and the traffic load can be reduced. Furthermore, since the transmission data also is set from the main control section to the satellite sensor, it possible to correspond to changes in the threshold specification with flexibility. For example, when there is a specification change to the threshold of the satellite sensor, the threshold after the change and the transmission data may be set to the relevant satellite sensor.

In addition, the normality of the satellite sensor is determined based on the diagnosis result of writing completion to the threshold storage memory which stores the threshold data and the transmission data. Therefore; defects can be detected when the generalized satellite sensors are set to individual specifications.

In the aforementioned embodiment, the satellite sensors 2 correspond to the impact detection section. The satellite sensors 2 detect the deceleration based on the output signal of the acceleration sensor 21, as the degree of shock applied to the vehicle. Furthermore, the threshold storage memory 27 corresponds to the threshold storage section and the transmission data storage section. Also the control circuit 24 corresponds to the storage control section, the transmission control section, and the self-diagnosis section.

Moreover, the main control section 1 corresponds to the main control section. The threshold table storage memory 15 corresponds to the threshold storage memory section. The transmission data table storage memory 16 corresponds to the transmission data storage memory section. The control circuit 12 corresponds to the setting control section and the detection section.

An embodiment of the present invention has been explained in detail with reference to the drawings; however, the specific construction is not limited to this embodiment, and includes design changes and the like within a scope which does not depart from the gist of the present invention. For example, the main control section 1 and the satellite sensors 2 may be connected by wireless communication.

INDUSTRIAL APPLICABILITY

According to the configuration of the present invention, it is possible to set a predetermined threshold for controlling transmission of the output signals with respect to the impact detection section of the satellite sensors and the like, from the main control section. Accordingly, it is possible to generalize the satellite sensors, and it is possible to decrease management costs associated with production and the like. Furthermore, it is possible to correspond to changes in the threshold specification with flexibility.

The invention claimed is:

1. An activation control device for an airbag device comprising:
    at least one impact detection section disposed at a predetermined position of a vehicle, which detects a degree of shock applied to the vehicle; and
    a main control section connected to the impact detection section by communication, which determines a collision state based on an output signal of the impact detection section received from the impact detection section, and controls activation of the airbag device installed in the vehicle;
    wherein the impact detection section comprises:
    a threshold storage section for storing threshold data relating to a detected degree of shock;
    a storage control section which receives the threshold data from the main control section and stores the threshold data in the threshold storage section; and
    a transmission control section which controls transmission of an output signal to the main control section based on threshold data stored in the threshold storage section; and
    the main control section comprises:
    a threshold storage memory section which stores predetermined threshold data corresponding to each impact detection section disposed in the vehicle; and
    a setting control section which transmits the threshold data stored in the threshold storage memory section to the corresponding impact detection section.

2. The activation control device for an airbag device according to claim 1, wherein: the impact detection section comprises a transmission data storage section for storing transmission data which has a one-to-one correspondence with the threshold data;
    the storage control section receives the transmission data from the main control section and stores it in the transmission data storage section;
    the transmission control section, in a situation where a degree of shock detected by the impact detection section within itself exceeds a threshold corresponding to any of the threshold data stored in the threshold storage section, transmits transmission data corresponding to the threshold data, stored in the transmission data storage section, to the main control section;
    the main control section comprises:
    a transmission data storage memory section which stores predetermined transmission data which has a one-to-one correspondence with the threshold data stored in the threshold storage memory section; and
    a detection section which detects a degree of shock detected by the impact detection section, by referring to stored information in the transmission data storage memory section, based on the transmission data received from the impact detection section; and
    the setting control section transmits the transmission data which is stored in the transmission data storage memory section to the impact detection section in which the corresponding threshold data is set.

3. The activation control device for an airbag device according to claim 1, wherein:
    the impact detection section comprises a self-diagnosis section which diagnoses a storage state of the threshold storage section furnished within itself, and transmits the diagnosis result to the main control section; and
    the main control section determines the normality of the impact detection section based on the diagnosis result received from the impact detection section.

4. The activation control device for an airbag device according to claim 3, wherein
    the main control section, in a situation where it did not receive from the impact detection section a diagnosis result showing normality of the impact detection section, outputs a determination result indicating that the impact detection section is not normal.

5. The activation control device for an airbag device according to claim 2, wherein:
    the impact detection section comprises a self-diagnosis section which diagnoses a storage state of the threshold storage section and the transmission data storage section furnished within itself, and transmits the diagnosis result to the main control section; and
    the main control section determines the normality of the impact detection section based on the diagnosis result received from the impact detection section.

6. The activation control device for an airbag device according to claim 5, wherein
    the main control section, in a situation where it did not receive from the impact detection section a diagnosis result showing normality of the impact detection section, outputs a determination result indicating that the impact detection section is not normal.

* * * * *